(12) United States Patent
Dai et al.

(10) Patent No.: US 10,859,840 B2
(45) Date of Patent: Dec. 8, 2020

(54) GRAPHICS RENDERING METHOD AND APPARATUS OF VIRTUAL REALITY

(71) Applicant: GOERTEK INC., Shandong (CN)

(72) Inventors: Tianrong Dai, Weifang (CN); Xin Zhang, Weifang (CN); Lei Cai, Weifang (CN)

(73) Assignee: GOERTEK INC., Weifang (CN)

( * ) Notice: Subject to any disclaimer, the term of this patent is extended or adjusted under 35 U.S.C. 154(b) by 0 days.

(21) Appl. No.: 16/638,734

(22) PCT Filed: Jul. 24, 2018

(86) PCT No.: PCT/CN2018/096858
§ 371 (c)(1),
(2) Date: Feb. 12, 2020

(87) PCT Pub. No.: WO2019/033903
PCT Pub. Date: Feb. 21, 2019

(65) Prior Publication Data
US 2020/0183166 A1    Jun. 11, 2020

(30) Foreign Application Priority Data
Aug. 14, 2017    (CN) .......................... 2017 1 0691256

(51) Int. Cl.
*G06F 3/01*      (2006.01)
*G02B 27/01*     (2006.01)
(Continued)

(52) U.S. Cl.
CPC ..... *G02B 27/0172* (2013.01); *G02B 27/0093* (2013.01); *G06F 3/013* (2013.01);
(Continued)

(58) Field of Classification Search
CPC ................................................ G06F 3/011–13
See application file for complete search history.

(56) References Cited

U.S. PATENT DOCUMENTS 6,414,681 B1 *  7/2002  Ohshima ................. G06F 3/012
                                                 345/428
10,157,448 B2 * 12/2018  Nguyen ................ G06T 3/0087
(Continued)

FOREIGN PATENT DOCUMENTS

CN      102722865 A      10/2012
CN      104618648 A       5/2015
(Continued)

OTHER PUBLICATIONS

Office Action in CN application No. 201710691256.5 dated Sep. 24, 2019.

*Primary Examiner* — Roy P Rabindranath
(74) *Attorney, Agent, or Firm* — Maschoff Brennan

(57) ABSTRACT

Provided are graphics rendering method and apparatus of virtual reality, which include according to an acquired spatial position information and direction information of a head-mounted virtual reality device, rendering in accordance with a first angular resolution to generate a first image corresponding to the spatial position information and the direction information; according to an acquired position information of a human eye fixation point on the display screen, rendering in accordance with a second angular resolution to generate a second image corresponding to the position information of the human eye fixation point; and synthesizing the first image and the second image into a third image. Since the first angular resolution and the second angular resolution adopted in the present disclosure are lower angular resolutions, when rendering a virtual reality image, the calculating amount of the GPU may be effectively reduced, and the image rendering efficiency may be improved.

10 Claims, 2 Drawing Sheets

(51) Int. Cl.
  *G02B 27/00*   (2006.01)
  *G06T 3/00*    (2006.01)
  *G06T 5/00*    (2006.01)
  *G06T 15/20*   (2011.01)
  *G06T 19/00*   (2011.01)

(52) U.S. Cl.
  CPC ............ *G06T 3/0093* (2013.01); *G06T 5/002* (2013.01); *G06T 15/205* (2013.01); *G06T 19/006* (2013.01); *G02B 2027/0187* (2013.01); *G06T 2200/04* (2013.01); *G06T 2207/20182* (2013.01)

(56) References Cited

U.S. PATENT DOCUMENTS

| | | | |
|---|---|---|---|
| 2014/0118357 A1* | 5/2014 | Covington | H04N 13/344 345/473 |
| 2017/0169602 A1* | 6/2017 | Blackmon | G06T 15/005 |
| 2017/0186231 A1 | 6/2017 | Petrov | |

FOREIGN PATENT DOCUMENTS

| | | | |
|---|---|---|---|
| CN | 105979224 A | 9/2016 | |
| CN | 106327584 A | 1/2017 | |
| CN | 106412563 A | 2/2017 | |
| CN | 106485790 A | 3/2017 | |
| CN | 106652004 A | 5/2017 | |
| CN | 106856009 A | 6/2017 | |
| CN | 107516335 A | 12/2017 | |
| WO | 2017219652 A1 | 12/2017 | |

\* cited by examiner

GRAPHICS RENDERING METHOD AND APPARATUS OF VIRTUAL REALITY

CROSS-REFERENCE TO RELATED APPLICATIONS

The present disclosure refers to Chinese Patent Application No. 201710691256.5, filed on Aug. 14, 2017, entitled "A Graphics Rendering Method and Apparatus of Virtual Reality", which is hereby incorporated by reference in its entirety.

TECHNICAL FIELD

The present disclosure relates to the field of virtual reality technology, and in particular to a method and an apparatus of graphics rendering a virtual reality.

BACKGROUND

The display resolution required to be supported by the existing virtual reality (VR for short) device is getting increasingly high, from 1 k, 2 k to 4 k, and may even be 8 k and 16 k screen resolutions in the future to eliminate the screen window effect of display and to enhance the authenticity of display effect under virtual environment. On the other hand, the increasingly high display resolutions also pose more and more challenges to the 3D graphics rendering capability of the graphics processing unit (GPU for short) of the VR device. When the performance of the GPU is insufficient, a compromise needs to be made between the graphics rendering quality and the graphics rendering output frame rate, either reducing the image quality requirement of the graphics rendering, or reducing the rendering output frame rate. For the VR application scenario, the output frame rate is yet a key indicator, and a user may suffer from dizziness when the output frame rate is insufficient. Even though the performance of the GPU is sufficient, as the computing load of the graphics rendering is quite heavy, a huge current consumption of the VR device may be caused, and finally introducing the problem of continuous heating.

Thereby, designs for active and passive heat dissipation are put forward higher requirements during the design of the VR product, and how to effectively reduce the rendering workload of GPU has become an important researching direction to solve the above problems.

SUMMARY

In order to solve the above problems, the present disclosure provides a graphics rendering method and a graphics rendering apparatus of virtual reality, which may reduce the calculating amount of graphics rendering and improve the output frame rate of graphics rendering.

The present disclosure provides a graphics rendering method of virtual reality, which includes:

according to an acquired spatial position information and direction information of a head-mounted virtual reality device, rendering in accordance with a first angular resolution to generate a first image corresponding to the spatial position information and the direction information, where the first angular resolution is less than an angular resolution of a display screen, the first image is an integral image corresponding to a field of vision of the virtual reality device, and the angular resolution refers to a quantity of pixel points corresponding to each degree of the field of vision within a range of the field of vision;

according to an acquired position information of a human eye fixation point on the display screen, rendering in accordance with a second angular resolution to generate a second image corresponding to the position information of the human eye fixation point, where the second angular resolution is equal to the angular resolution of the display screen, and the second image is a local image around a position of the human eye fixation point; and synthesizing the first image and the second image into a third image.

Optionally, the first angular resolution is acquired according to a preset percentage multiplied by the angular resolution of the display screen, and the preset percentage is determined according to a balance point between a required graphics rendering quality and a graphics rendering calculating amount.

Optionally, the second angular resolution is the angular resolution of the display screen of the virtual reality device, a resolution of the local image is acquired according to a preset horizontal field of vision and vertical field of vision of the local image multiplied by the second angular resolution, and the preset horizontal field of vision and the preset vertical field of vision of the local image are determined according to an image range of a required fixation point rendering effect.

Optionally, the according to the acquired position information of the human eye fixation point on the display screen, rendering in accordance with the second angular resolution to generate the second image corresponding to the position information of the human eye fixation point includes:

according to the position information of the human eye fixation point, determining the direction information of the human eye fixation point by combining the direction information of the head-mounted virtual reality device; and according to the position information of the human eye fixation point and the direction information of the human eye fixation point, generating the second image corresponding to the position information of the human eye fixation point and the direction information of the human eye fixation point in accordance with the second angular resolution.

Optionally, the synthesizing the first image and the second image into the third image includes:

reconstructing low resolution of the first image into high resolution identical with resolution of the display screen;

covering a position corresponding to the position information of the human eye fixation point in the first image after high-resolution reconstruction with the second image according to the position information of the human eye fixation point to acquire the third image; and performing smooth fusion processing on a splicing boundary of the third image.

Optionally, the reconstructing the low resolution of the first image into the high resolution identical with the resolution of the display screen includes:

performing spatial conversion on the first image with low resolution to acquire a YCbCr spatial image thereof, where Y is a non-linear brightness component, Cb is a blue color difference component, Cr is a red color difference component, and Cb and Cr components are reconstructed by using an interpolation method;

constructing a database for training by combining a high-resolution image block Xh and a low-resolution image block Xl into database X;

generating a dictionary D for the database X by using a sparse coding method, and decomposing the dictionary D into a dictionary Dh of a high-resolution image and a dictionary Dl of a low-resolution image;

solving a sparse coefficient by using the Dl and a characteristic image corresponding to two times of up-sampled image of the first image with low resolution;

solving three times of up-sampled image which is Y component, of the first image with low resolution through the sparse coefficient and the Dh; and combining Y, Cb and Cr to acquire a YCbCr image, converting the YCbCr image into an RGB image, and storing the RGB image to acquire the first image after high-resolution reconstruction.

Optionally, the performing smooth fusion processing on the splicing boundary of the third image includes:

smoothing YUV color coding data at the splicing boundary of the third image to YUV color coding data of the whole third image by using a weighted smoothing formula $Y=Y1*(1-d)+Y2*d$, where Y1 and Y2 are values of YUV color coding data of adjacent images at the splicing boundary respectively, Y is a value of YUV color coding data of an overlapped image at the splicing boundary, and d is a weight; and directly copying YUV color coding data at a non-splicing boundary into the YUV color coding data of the whole third image for transition processing.

The present disclosure further provides a graphics rendering apparatus of virtual reality, which includes:

a first image generating module, configured to according to an acquired spatial position information and direction information of a head-mounted virtual reality device, render in accordance with a first angular resolution to generate a first image corresponding to the spatial position information and the direction information, where the first angular resolution is less than an angular resolution of a display screen, the first image is an integral image corresponding to a field of vision of the virtual reality device, and the angular resolution refers to a quantity of pixel points corresponding to each degree of the field of vision within a range of the field of vision;

a second image generating module, configured to according to an acquired position information of a human eye fixation point on the display screen, render in accordance with a second angular resolution to generate a second image corresponding to the position information of the human eye fixation point, where the second angular resolution is equal to the angular resolution of the display screen, and the second image is a local image around a position of the human eye fixation point; and a third image generating module, configured to synthesize the first image and the second image into a third image.

Optionally, the first angular resolution is acquired according to a preset percentage multiplied by the angular resolution of the display screen, and the preset percentage is determined according to a balance point between a required graphics rendering quality and a graphics rendering calculating amount.

Optionally, the second angular resolution is the angular resolution of the display screen of the virtual reality device, a resolution of the local image is acquired according to a preset horizontal field of vision and vertical field of vision of the local image multiplied by the second angular resolution, and the preset horizontal field of vision and the preset vertical field of vision of the local image are determined according to an image range of a required fixation point rendering effect.

The present disclosure further provides a graphics rendering apparatus of virtual reality, which includes: a graphics processor and a memory, the memory is used for storing a program that supports the graphics rendering apparatus of virtual reality to execute the above graphics rendering method of virtual reality, and the graphics processor is configured to execute the program stored in the memory.

The program includes one or more computer instructions, where the one or more computer instructions are invoked and executed by the graphics processor.

The present disclosure further provides a computer storage medium which is used for storing computer software instructions used by the graphics rendering apparatus of virtual reality, where the computer software instructions include a program involved in the graphics rendering apparatus of virtual reality for executing the graphics rendering method of virtual reality.

In the embodiments of the present disclosure, according to an acquired spatial position information and direction information of a head-mounted virtual reality device, rendering in accordance with a first angular resolution to generate a first image corresponding to the spatial position information and the direction information, where the first angular resolution is less than an angular resolution of a display screen, and the first image is an integral image corresponding to a FOV of the virtual reality device; according to an acquired position information of a human eye fixation point on the display screen, rendering in accordance with a second angular resolution to generate a second image corresponding to the position information of the human eye fixation point, where the second angular resolution is equal to the angular resolution of the display screen, and the second image is a local image around a position of the human eye fixation point; and synthesizing the first image and the second image into a third image. According to the present disclosure, when a virtual reality picture is rendered through a GPU, an integral image is generated by adopting low-angular resolution rendering, a local image around the human eye fixation point is rendered by adopting an angular resolution identical with the display screen to generate a local clear image, and the integral image and the local clear image are fused to generate a final image sent to the virtual reality display screen for displaying, so that the calculating amount of the GPU may be effectively reduced, and the image rendering efficiency may be improved.

BRIEF DESCRIPTION OF THE DRAWINGS

The drawings described herein are intended to provide a further understanding of the present disclosure, and are intended to be a part of the present disclosure. The example embodiment of the present disclosure and the description thereof are for explaining the present disclosure and do not constitute a limitation to the present disclosure. In the drawings.

DETAILED DESCRIPTION OF EXAMPLE EMBODIMENTS

For making the purposes, technical solutions and advantages of the embodiments of the present invention clearer, the technical solutions in the embodiments of the present invention will be clearly and completely described below in combination with the drawings in the embodiments of the present invention. It is apparent that the described embodiments are not all embodiments but part of embodiments of the present invention. All other embodiments obtained by those of ordinary skill in the art on the basis of the embodiments in the present invention without creative work shall fall within the scope of protection of the present disclosure.

Virtual reality refers to a mode of adding a virtualizing technology to a user's senses and then observing the world, and the virtual reality is superimposed on the real world to be perceived by the user after the simulation of science and technology, so as to achieve surreal sensual experience.

An application scenario of the present disclosure is exemplified as follows.

The head t of a user's hat wears a virtual reality (Virtual Reality, VR) head mounted display moves, spatial position and direction information of the head are generated through a sensor such as an IMU 9-axis sensor, a spatial position sensor and the like, the head position and direction information are delivered to a VR game engine, and a game state is updated by the VR game engine, a graphics rendering instruction is submitted by the VR game engine through an Application Programming Interface (API) to a Graphics Processing Unit (GPU) according to the game state and the latest head position and direction information. The GPU outputs two 2D images corresponding to the left and right eyes after the rendering, and sends them to the VR display screen for display. Since each frame of monocular image rendering will output a 2D image, with its resolution and field of vision (FOV) identical with the resolution and FOV of the display screen of the VR device, rendering calculating amount are quite large due to its high resolution and the high rendering accuracy required by VR.

The technical problem to be solved by the present disclosure is how to reduce the graphics rendering calculating amount of a graphics processing unit (GPU) of VR device, where the VR device includes head-mounted VR device.

Figure 1:
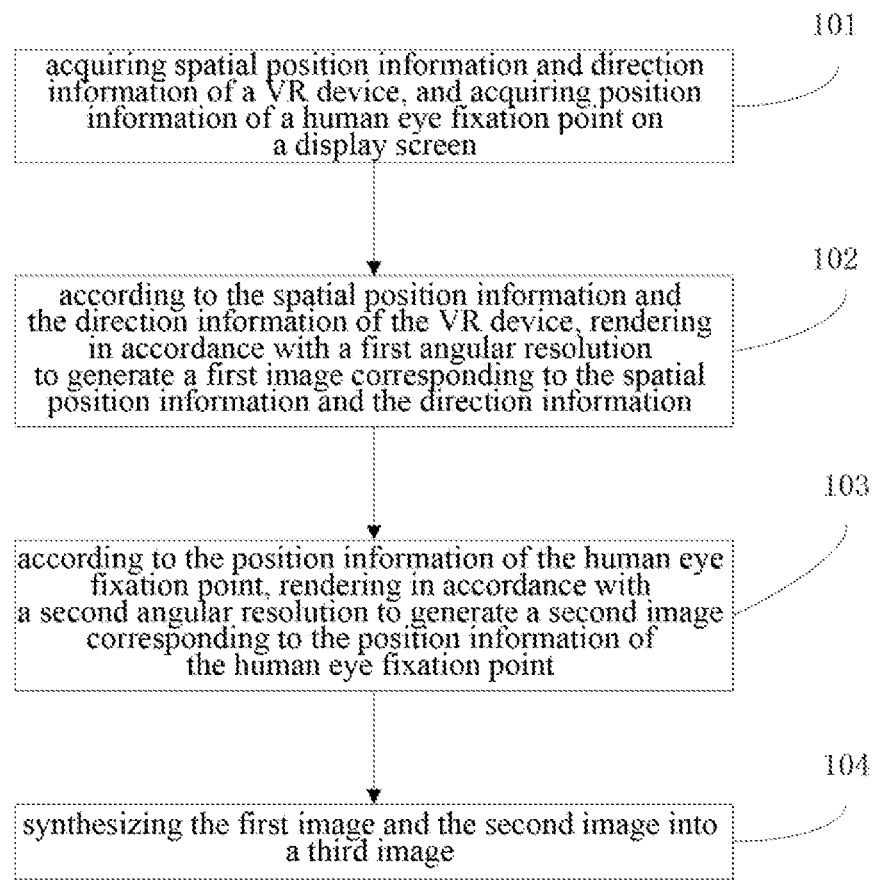
FIG. 1 is a flow diagram of a graphics rendering method of virtual reality according to an embodiment of the present disclosure.

FIG. 1 is a flow diagram of a graphics rendering method of virtual reality according to an embodiment of the present disclosure, as shown in FIG. 1, 101, acquiring spatial position information and direction information of a VR device, and acquiring position information of a human eye fixation point on a display screen.

According to the embodiment of the present disclosure, the spatial position information and the direction information of the head-mounted VR device may be acquired mainly through spatial positioning technology. There are currently two main space positioning methods for the VR device, with one being basic spatial positioning that only supports 3DOF (Degree of Freedom), and the other being spatial positioning that supports 6DOF. The 3DOF positioning only outputs the direction information (pitch, yaw, roll) of the head mounted display, and the fixed position is used as the spatial position information of the head mounted display when the graphic rendering is carried out in this case; and the 6DOF positioning outputs spatial position information (x, y, z) in addition to the direction information. The spatial positioning technology may be any technology in the prior art that can acquire the spatial position information and direction information of the head-mounted VR device, which is not limited in the present disclosure. Usually, 3DOF information is acquired by a 9-axis sensor, and the spatial position information of 6DOF may be acquired by an outside-in solution based on a laser/infrared camera, or by an inside-out solution (SLAM) based on computational vision. For example, a camera is equipped on the user's head-mounted VR device, so that the image collected by the camera moves with the movement of the head, and the object in the image or the feature point in the image or the edge of the object moves with the movement of the head; and the images of surrounding object continuously collected by the camera are analyzed to acquire the information of the continuously changing positions in the images, thereby acquiring the spatial position information and the direction information of the head-mounted VR device.

Since the FOV of a human eye is limited, in general, only the central portion of the image reflected on the retina of the human eye may be resolved clearly, which is commonly referred to as the resolved FOV, about 8 to 15 degrees of FOV. The portion between 15 and 30 degrees of the FOV is referred to as the effective FOV in which a user may see the presence and motion of an object clearly, yet the resolution has been reduced, although it is not necessary to turn the head to see clearly. A peripheral portion with the FOV of more than 30 degrees is referred to as the induced FOV which may only sense the presence of an object and may not see clearly what the object is.

According to the embodiments of the present disclosure, the position information of the human eye fixation point on the display screen is acquired by adopting human eye tracking technology through the above characteristics of human eyes. For example, various detection means such as electronics/optics may be utilized to acquire the user's current "fixation direction". According to the present disclosure, certain eye structures and characteristics with constant relative position when the eyeball rotates are used as reference, line-of-sight change parameters are extracted between the position change characteristics and the invariant characteristics, and then the line-of-sight direction is acquired through a geometric model or a mapping model.

Where, there are generally three types of characteristics extracted according to human eyes: 1) the vector of pupil center and corneal reflection; 2) the corneal reflection matrix; and 3) the elliptical boundary of iris. Currently, a video tracking system (VOG) based on eye video analysis generally uses the pupil-corneal reflection method to acquire the line-of-sight direction by tracking the relative position of the pupil center and the corneal reflection. Corneal reflection is a virtual image formed by the reflection of a light source (typically a near-infrared light source) on the surface of the cornea, and a virtual image formed by the corneal refraction of a pupil in an eye image is acquired by the camera. For example, the captured eye image is subjected to image processing to extract pupil center and light spot position information, to extract a plane line-of-sight direction parameter, and then the plane information is converted into human eye spatial line-of-sight information data by the established mathematical model.

In embodiments of the present disclosure, a line-of-sight mapping relationship may be preset in advance within the head-mounted VR device. The line-of-sight mapping relationship is a mapping relationship between human eye spatial line-of-sight information data and coordinates of left-right pixel point pairs of an image display source on the head-mounted VR device (also referred to a line-of-sight-screen coordinate mapping relationship).

According to the embodiment, the position information of the human eye fixation point on the display screen is acquired specifically as follows:

the line-of-sight tracking system records human eye spatial line-of-sight information data when a user gazes at a certain object. Specifically: when the user watches the external environment through the head-mounted VR device, the line-of-sight tracking system tracks the line-of-sight change of the eyeballs of the user in real time, when the user gazes at a certain target object, the line-of-sight tracking system calculates the human eye spatial line-of-sight information data of the user at the moment, and therefore the coordinate position data of the corresponding image display source pixel point pair, namely the position information of the human eye fixation point, is acquired according to the transmitted human eye spatial line-of-sight information data and the line-of-sight mapping relation.

102, according to the spatial position information and the direction information of the VR device, rendering in accordance with a first angular resolution to generate a first image corresponding to the spatial position information and the direction information.

The first angular resolution adopted in the embodiment of the present disclosure is less than an angular resolution of a display screen, the first image is an integral image corresponding to a field of vision of the virtual reality device, and the angular resolution refers to a quantity of pixel points corresponding to each degree of the field of vision within a range of the field of vision; it is assumed that the display resolution of the VR device is monocular 1200*1080, the horizontal FOV is 100 degree, and the vertical FOV is 90 degree, then horizontal angular resolution is 1200/100=12 pixels/degree; and the vertical angular resolution is: 1080/90=12 pixels/degree. Therefore, the first angular resolution addressed in the present embodiment is acquired according to a preset percentage multiplied by the angular resolution of the display screen, and the preset percentage is determined according to a balance point between a required graphics rendering quality and a graphics rendering calculating amount.

It should be noted that if the graphics rendering quality is required to be high, the graphics rendering calculating amount is naturally large, at such case, the graphics rendering output frame rate will be reduced, and the graphics rendering calculating amount is inevitably reduced if in order to improve the graphics rendering output frame rate, that is, the graphics rendering quality is reduced, therefore, the graphics rendering quality and the graphics rendering calculating amount are inversely proportional, that is, in practical applications, the graphics rendering quality and the graphics rendering calculating amount need to be compromised, either reducing the graphics rendering quality requirement, or reducing the graphics rendering calculating amount. In the process of implementing the present disclosure, according to a large amount of feedback information of users' VR experience, a user will get dizzy when the output frame rate of the VR device is less than a certain output frame rate threshold, therefore, in the embodiment of the present disclosure, corresponding graphics rendering calculating amount threshold may be determined according to the output frame rate threshold, and corresponding graphics rendering quality threshold may be determined according to the graphics rendering calculating amount threshold, and it is possible thereby to acquire that the graphics rendering calculating amount threshold and the graphics rendering quality threshold are the balance point between the balance points between the graphics rendering quality and the graphics rendering calculating amount, and a percentage of the first angular resolution is calculated according to the balance point in a preset mode.

Figure 2:
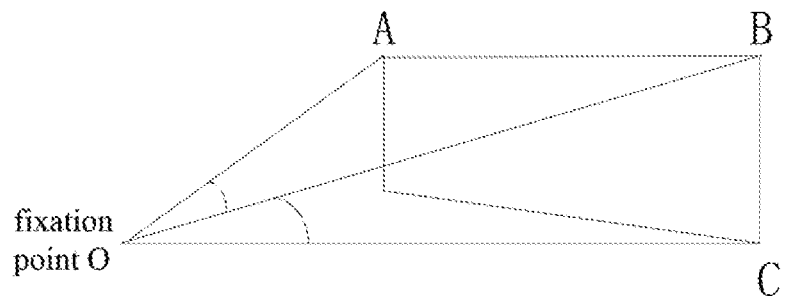
FIG. 2 is a schematic diagram of a field of vision adopted by the embodiments of the present disclosure.

FIG. 2 is a schematic diagram of a field of vision adopted by the embodiment of the present disclosure, as shown in FIG. 2, it is assumed that the display resolution of the VR device is monocular 1200*1080, the horizontal FOV is 100 degree, and the vertical FOV is 90 degree, then the horizontal angular resolution is 1200/100=12 pixel points. It is assumed that the first angular resolution is the ⅓ of the original resolution, i.e. the resolution is 400×360, the spatial position information and the direction information of the VR device, the horizontal FOV of 100 degree, and the vertical FOV of 90 degree and the resolution of 400×360 are input in the GPU rendering program to generate a first image in the GPU, and therefore, the first image is an integral low-resolution image, which is rendered at a normal rendering accuracy but is rendered at a lower resolution, such that the rendering calculating amount may be greatly reduced.

103, according to the position information of the human eye fixation point, rendering in accordance with a second angular resolution to generate a second image corresponding to the position information of the human eye fixation point.

The basic motion mode of the human eye fixation point is gazing and jumping, and generally the fixation duration is more than 100 ms to see an object clearly. In an eyeball tracking system, the frame rate of a camera is usually above 60 Hz, and the time to capture every frame image and algorithm calculate is usually below 30 ms. Therefore, when determining the FOV of a local image, only the interference effect of the effective FOV and the splicing line in the induced FOV on vision when gazing the resolved FOV is generally considered, and the factor of the human eye rotating speed is not considered.

According to the embodiment of the present disclosure, a region range of the second image is firstly determined according to the position information of the human eye fixation point, and the second image is a corresponding second image of the local image around the position of the human eye fixation point generated by rendering according to a second angular resolution within the region range of the second image.

Where, the second angular resolution is the angular resolution of the display screen of the virtual reality device, and the resolution of the local image is acquired according to a preset horizontal FOV and vertical FOV of the local image multiplied by the second angular resolution. Due to the fact that the smaller the local image is, the poorer the fixation point rendering effect is, and due to the fact that the display resolution of the region close to the fixation point in the FOV may influence the observation effect of people, the larger the local image, the farther the peripheral region of low resolution is, the less influence it has on the observation effect, therefore the preset horizontal FOV and the preset vertical FOV of the local image are determined according to an image range of the required fixation point rendering effect.

It should be noted that if the fixation point rendering technique is not used, the entire image is quite clear, but the calculating amount and power consumption of the GPU are quite large. If the fixation point rendering technique is used, only the place where the eyeball fixates is clear, and the other places are relatively blurry, as a result, the GPU's calculating amount is greatly reduced. Herein, in fact, the clear picture of the place where the eye fixates uses the eyeball tracking system to acquire the human eye fixation point, the rendering effect of the local image around the human eye fixation point is better, while the rendering effect of other places is gradually reduced by taking the human eye fixation point as a circle, so that the horizontal FOV and the vertical FOV of the local image can be determined according to an image range of the required eye fixation point rendering effect For example, since the second image is a local picture of the integral image, the rendering FOV used is smaller than the original integral FOV, such as 40 degrees horizontally and 36 degrees vertically. Since the second image is a local clear picture around the human eye fixation point, it is necessary to keep the original sharpness, i.e. the angular resolution (e.g. 12 pixels/degree) is constant, and the corresponding resolution is 480×432 (12×40=480, 12×36=432). And new direction information is calculated by adopting the position information of the human eye fixation point and the head direction information.

It should be noted that when a corresponding second image is generated by rendering in accordance with a second angular resolution, the direction information of the human eye fixation point is determined according to the position information of the human eye fixation point and the direction information of the head-mounted virtual reality device; and further according to the head position information and the direction information of the human eye fixation point, a second image corresponding to the position information of the human eye fixation point and the direction information of the human eye fixation point is generated by rendering in accordance with the second angular resolution. For example, when general VR graphics are rendered, the head direction information, namely the direction information corresponding to the fixation point when the human eye is looking straight ahead, is submitted to the GPU, at such case the fixation point is located at the intersection point O between the optical axis of the VR lens and the display plane, and the position of the intersection point O on the display plane is known information. The vector from the human eye to the intersection point O between the optical axis and the display plane is set to be V1 (namely, the head direction information), V1 is perpendicular to the display plane, the fixation point is set to be F (known), the vector from the intersection point O of the display plane to the fixation point F is V2 (V2=F−O), the vector from the human eye to the fixation point F is V3=V1+V2, and V3 is the required direction information of the human eye fixation point.

104, synthesizing the first image and the second image into a third image.

Figure 3:
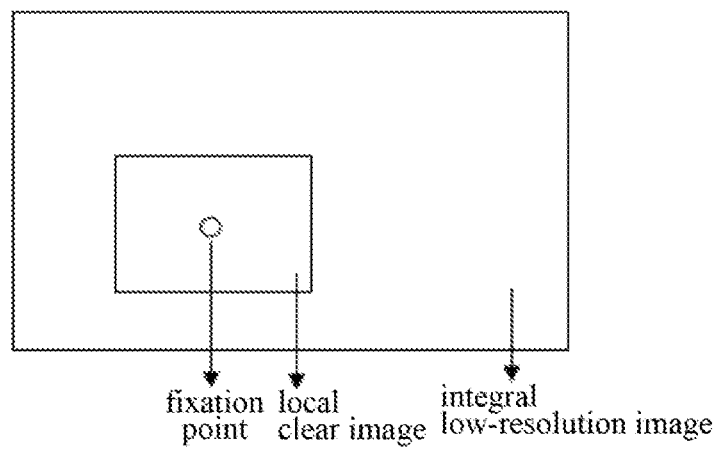
FIG. 3 is a schematic diagram of an image synthesizing adopted by the embodiments of the present disclosure.

The specific implementation includes:

reconstructing the resolution of the first image to be identical with the resolution of the display screen by means of interpolation and the like, that is, the resolution of the first image is subjected to original high-resolution reconstruction by means of interpolation and the like; and covering (which may be rectangular covering or processing into a circle and then covering) a position corresponding to the position information of the human eye fixation point in the first image after high-resolution reconstruction with the second image according to the position information of the human eye fixation point to acquire a third image. FIG. 3 is a schematic diagram of image synthesis adopted by the embodiment of the present disclosure. As shown in FIG. 3, the local clear image is the second image and the integral low-definition image is the first image.

Smooth fusion processing is performed on the splicing boundary of the third image, for example, smooth fusion processing is performed on the boundary region of the third image by means of low-pass filtering and the like.

In an alternative embodiment, the specific implementation process of performing the original high-resolution reconstruction on the resolution of the first image by means of interpolation and the like includes:

performing spatial conversion on the first image with low resolution to acquire a YCbCr spatial image thereof, where Y is a non-linear brightness component, Cb is a blue color difference component, Cr is a red color difference component, and Cb and Cr components are reconstructed by an interpolation method;

constructing a database for training, namely a high-resolution image block Xh and a low-resolution image block Xl being combined into the database X;

generating a dictionary D for the database X by using a sparse coding method, and decomposing the dictionary D into a dictionary Dh of a high-resolution image and a dictionary Dl of a low-resolution image;

solving a sparse coefficient by using the Dl and a characteristic image corresponding to the two times of up-sampled image of the first image with low resolution;

solving three times of up-sampled image, namely Y component, of the first image with low resolution through the sparse coefficient and Dh; and combining Y, Cb and Cr to acquire a YCbCr image, converting the YCbCr image into an RGB image, and storing the RGB image to acquire the first image after high-resolution reconstruction.

Where, the above-mentioned interpolation method may be a bicubic interpolation method.

The Y component is recorded as lIm, 2-times up-sampling is performed to acquire a corresponding approximate 2-times high-resolution image fIm, where sampling data corresponding to the approximate 2-times high-resolution image fIm is used as a source of the corresponding Dh, a ⅓ down-sampling result lfIm is performed on the fIm, and a 2-times up-sampling result is used as a data source l2bfIm of the Dl; what corresponds to the lfIm is an image block of point-by-point sampling 3×3, with the overlapped sampling part overlap=2, what corresponds to the fIm is an image block of sampling 9×9, with the corresponding overlapped part 3*overlap, and what corresponds to l2bfIm is an image block of sampling 6×6, with the corresponding overlapped part 2*overlap; Xh is the result of subtracting the mean value from the current block, and Xl is the characteristic image of solving for l2bfIm.

The Xh and Xl are normalized respectively, spliced into a data X, and normalized, and then trained by using a Sparse Coding method, and finally the acquired D is split into Dh and Dl.

According to the method, the corresponding characteristic image may be solved through a filter, four groups of sampling data are acquired through 6×6 sampling, the overlapping part of the image block of the characteristic image corresponding to the overlapping part overlap and fIm of the lIm of a given low-resolution color image in the sampling process is 2*overlap, and then the sparse coefficient α of the corresponding image block is acquired by utilizing the data.

After solving by using α and Dh to acquire Xh, the mean value of fIm is increased to acquire a final high-resolution image block; for the boundary, 3 times of up-sampling is performed on a given low-resolution color image through interpolation to acquire a final boundary image block; and the final high-definition image block and the final boundary image block are synthesized into Y-component, where the average value is taken for overlapping image block.

Therefore, the high-resolution reconstruction method of the embodiment may directly construct an approximate high-resolution image through a low-resolution image thereof without a high-resolution image library, then establish a sampling block, acquire a corresponding training dictionary, acquire a corresponding sparse coefficient through a sparse representation theory by means of the dictionary Dl of the low-resolution image trained at the moment, and finally apply the sparse coefficient to the dictionary Dh of the high-resolution image and reconstruct to acquire a high-resolution image.

In an alternative embodiment, the performing smooth fusion processing on the splicing boundary of the third image specifically includes:

smoothing the YUV color coding data at the splicing boundary of the third image to the YUV color coding data of the whole third image by using a weighted smoothing formula $Y=Y1*(1-d)+Y2*d$, where Y1 and Y2 are the values of the YUV color coding data of adjacent images at the splicing boundary respectively, Y is the value of the YUV color coding data of an overlapped image at the splicing boundary, and d is a weight; and directly copying the YUV color coding data at the non-splicing boundary into the YUV color coded data of the whole image for transition processing.

It should be noted that the technical solution of the present disclosure may realize fixation point rendering outside a GPU program, that is, in the case where the GPU program does not need to support fixation point rendering, the output image (the third image) required for fixation point rendering in the embodiment of the present disclosure can also be realized in a plug-in unit of a 3D engine.

In the embodiments of the present disclosure, according to the acquired spatial position information and direction information of head-mounted virtual reality device, a first image corresponding to the spatial position information and the direction information is generated by rendering according to a first angular resolution, where the first angular resolution is less than the angular resolution of a display screen, and the first image is an integral image corresponding to the FOV of the virtual reality device; according to the acquired position information of the human eye fixation point on the display screen, a second image corresponding to the position of the human eye fixation point is generated by rendering according to a second angular resolution, where the second angular resolution is equal to the angular resolution of the display screen, and the second image is a local image around the position of the human eye fixation point; and the first image and the second image are synthesized into a third image. According to the present disclosure, when a virtual reality picture is rendered through a GPU, an integral image is generated by adopting low-angle resolution rendering, a local image around the human eye fixation point is rendered by adopting the same angular resolution as the display screen to generate a local clear image, and the integral image and the local clear image are fused to generate a final image sent to the virtual reality display screen for display, so that the calculating amount of the GPU may be effectively reduced, and the image rendering efficiency may be improved.

Figure 4:
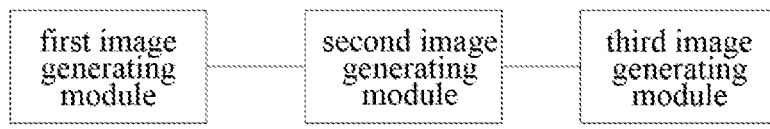
FIG. 4 is a structural schematic diagram of a graphics rendering apparatus of virtual reality according to an embodiment of the present disclosure.

FIG. 4 is a structural schematic diagram of a graphics rendering apparatus of virtual reality according to an embodiment of the present disclosure, which as shown in FIG. 4 includes:

a first image generating module, configured to according to an acquired spatial position information and direction information of a head-mounted virtual reality device, render in accordance with a first angular resolution to generate a first image corresponding to the spatial position information and the direction information, where the first angular resolution is less than an angular resolution of a display screen, the first image is an integral image corresponding to a field of vision of the virtual reality device, and the angular resolution refers to a quantity of pixel points corresponding to each degree of the field of vision within a range of the field of vision;

a second image generating module, configured to according to an acquired position information of a human eye fixation point on the display screen, render in accordance with a second angular resolution to generate a second image corresponding to the position information of the human eye fixation point, where the second angular resolution is equal to the angular resolution of the display screen, and the second image is a local image around a position of the human eye fixation point; and a third image generating module, configured to synthesize the first image and the second image into a third image.

Where, the first angular resolution is acquired according to a preset percentage multiplied by the angular resolution of the display screen, and the preset percentage is determined according to a balance point between a required graphics rendering quality and a graphics rendering calculating amount.

Where, the second angular resolution is the angular resolution of the display screen of the virtual reality device, a resolution of the local image is acquired according to a preset horizontal field of vision and vertical field of vision of the local image multiplied by the second angular resolution, and the preset horizontal field of vision and the preset vertical field of vision of the local image are determined according to an image range of a required fixation point rendering effect.

Where, the second image generating module is specifically configured to:

determine the direction information of the human eye fixation point by combining the direction information of the head-mounted virtual reality device according to the position information of the human eye fixation point; and according to the position information of the human eye fixation point and the direction information of the human eye fixation point, generate in accordance with the second angular resolution a second image corresponding to the position information of the human eye fixation point and the direction information of the human eye fixation point.

Where, the third image generating module is specifically configured to:

reconstruct the resolution of the first image to be identical with the resolution of the display screen, with specific implementation with reference to the related description in the embodiment of FIG. 1;

cover a position corresponding to the position information of the human eye fixation point in the first image after high-resolution reconstruction with the second image according to the position information of the human eye fixation point to acquire a third image; and perform smooth fusion processing on the splicing boundary of the third image, with specific implementation with reference to the related description in the embodiment of FIG. 1.

Upon the apparatus of the embodiment of the present disclosure, according to an acquired spatial position information and direction information of a head-mounted virtual reality device, rendering in accordance with a first angular resolution to generate a first image corresponding to the spatial position information and the direction information, where the first angular resolution is less than an angular resolution of a display screen, and the first image is an integral image corresponding to a FOV of the virtual reality device; according to an acquired position information of a human eye fixation point on the display screen, rendering in accordance with a second angular resolution to generate a second image corresponding to the position information of the human eye fixation point, where the second angular resolution is equal to the angular resolution of the display screen, and the second image is a local image around a position of the human eye fixation point; and synthesizing the first image and the second image into a third image. According to the present disclosure, when a virtual reality picture is rendered through a GPU, an integral image is generated by adopting low-angular resolution rendering, a local image around the human eye fixation point is rendered by adopting an angular resolution identical with the display screen to generate a local clear image, and the integral image and the local clear image are fused to generate a final image sent to the virtual reality display screen for displaying, so that the calculating amount of the GPU may be effectively reduced, and the image rendering efficiency may be improved.

In the embodiment of the present disclosure, the structure of the graphics rendering apparatus of virtual reality includes a graphics processor and a memory, the memory is used for storing a program that support the graphics rendering apparatus of virtual reality to execute the above graphics rendering method of virtual reality as illustrated in the embodiment of FIG. 1, and the graphics processor is configurable to execute the program stored in the memory.

The program includes one or more computer instructions, where the one or more computer instructions are invoked and executed by the graphics processor.

The embodiment of the present disclosure further provides a computer storage medium which is used for storing computer software instructions used by the graphics rendering apparatus of virtual reality, where the computer software instructions comprise a program involved in the graphics rendering apparatus of virtual reality for executing the graphics rendering method of virtual reality.

Those skilled in the art should know that the embodiment of the present invention may be provided as a method, a system or a computer program product. Therefore, the present invention may adopt a form of pure hardware embodiment, pure software embodiment and combined software and hardware embodiment. Moreover, the present invention may adopt a form of computer program product implemented on one or more computer-available storage media (including, but not limited to, a disk memory, a Compact Disc Read-Only Memory (CD-ROM) and an optical memory) including computer-available program codes.

The present invention is described with reference to flowcharts and/or block diagrams of the method, a device (system) and computer program product according to the embodiment of the present invention. It is to be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of another programmable data processing device to generate a machine, so that an apparatus for realizing a function specified in one flow or more flows in the flowcharts and/or one block or more blocks in the block diagrams is generated by the instructions executed through the computer or the processor of the other programmable data processing device.

These computer program instructions may also be stored in a computer-readable memory capable of guiding the computer or the other programmable data processing device to work in a specific manner, so that a product including an instruction apparatus may be generated by the instructions stored in the computer-readable memory, the instruction apparatus realizing the function specified in one flow or many flows in the flowcharts and/or one block or many blocks in the block diagrams.

These computer program instructions may further be loaded onto the computer or the other programmable data processing device, so that a series of operating steps are executed on the computer or the other programmable data processing device to generate processing implemented by the computer, and steps for realizing the function specified in one flow or many flows in the flowcharts and/or one block or many blocks in the block diagrams are provided by the instructions executed on the computer or the other programmable data processing device.

In a typical configuration, a computing device includes one or more CPUs, an input/output interface, a network interface and a memory.

The memory may include forms of a volatile memory, Random Access Memory (RAM) and/or non-volatile memory, etc. in computer-readable media, for example, a Read-Only Memory (ROM) or a flash RAM. The memory is an example of the computer-readable medium.

The computer-readable medium includes non-volatile, non-volatile, removable and fixed media and may store information by any method or technology. The information may be a computer-readable instruction, a data structure, a program module or other data. Examples of a computer storage medium includes, but not limited to, a Phase-change RAM (PRAM), a Static RAM (SRAM), a Dynamic RAM (DRAM), a RAM of other types, a ROM, an Electrically Erasable Programmable ROM (EEPROM), a flash memory or other memory technologies, a CD-ROM, a Digital Video Disk (DVD) or other optical memories, a cassette tape, a tape disk memory or other magnetic storage devices or any other non-transmission media, and may be configured to store information accessible for the computing device. It is defined herein that the computer-readable medium does not include transitory media, for example, a modulated data signal and a carrier.

It is also to be noted that terms "include", "contain" or any other variants thereof are intended to include nonexclusive inclusions, thereby ensuring that a process, method, commodity or device including a series of elements not only includes those elements but also includes other elements which are not clearly listed or further includes elements intrinsic to the process, the method, the commodity or the device. Under the circumstance of no more restrictions, an element defined by statement "including a/an" does not exclude existence of another element which is the same in a process, method, commodity or device including the element.

Those skilled in the art should know that the embodiment of the present invention may be provided as a method, a system or a computer program product. Therefore, the present invention may adopt a form of pure hardware embodiment, pure software embodiment and combined software and hardware embodiment. Moreover, the present invention may adopt a form of computer program product implemented on one or more computer-available storage media (including, but not limited to, a disk memory, a Compact Disc Read-Only Memory (CD-ROM) and an optical memory) including computer-available program codes.

The above is only the embodiment of the present disclosure and not intended to limit the present disclosure. Those skilled in the art may make various modifications and variations to the present disclosure. Any modifications, equivalent replacements, improvements and the like made within the spirit and principle of the present disclosure shall fall within the scope of the claims of the present disclosure.

What is claimed is:

1. A graphics rendering method of virtual reality, comprising:
   according to an acquired spatial position information and direction information of a head-mounted virtual reality device, rendering in accordance with a first angular resolution to generate a first image corresponding to the spatial position information and the direction information, wherein the first angular resolution is less than an angular resolution of a display screen, the first image is an integral image corresponding to a field of vision of the virtual reality device, and the angular resolution refers to a quantity of pixel points corresponding to each degree of the field of vision within a range of the field of vision;
   according to an acquired position information of a human eye fixation point on the display screen, rendering in accordance with a second angular resolution to generate a second image corresponding to the position information of the human eye fixation point, wherein the second angular resolution is equal to the angular resolution of the display screen, and the second image is a local image around a position of the human eye fixation point; and
   synthesizing the first image and the second image into a third image.

2. The method according to claim 1, wherein the first angular resolution is acquired according to a preset percentage multiplied by the angular resolution of the display screen, and the preset percentage is determined according to a balance point between a required graphics rendering quality and a graphics rendering calculating amount.

3. The method according to claim 1, wherein the second angular resolution is the angular resolution of the display screen of the virtual reality device, a resolution of the local image is acquired according to a preset horizontal field of vision and vertical field of vision of the local image multiplied by the second angular resolution, and the preset horizontal field of vision and the preset vertical field of vision of the local image are determined according to an image range of a required fixation point rendering effect.

4. The method according to claim 1, wherein the according to the acquired position information of the human eye fixation point on the display screen, rendering in accordance with the second angular resolution to generate the second image corresponding to the position information of the human eye fixation point comprises:
   according to the position information of the human eye fixation point, determining the direction information of the human eye fixation point by combining the direction information of the head-mounted virtual reality device; and
   according to the position information of the human eye fixation point and the direction information of the human eye fixation point, generating the second image corresponding to the position information of the human eye fixation point and the direction information of the human eye fixation point in accordance with the second angular resolution.

5. The method according to claim 1, wherein the synthesizing the first image and the second image into the third image comprises:
   reconstructing low resolution of the first image into high resolution identical with resolution of the display screen;
   covering a position corresponding to the position information of the human eye fixation point in the first image after high-resolution reconstruction with the second image to according to the position information of the human eye fixation point to acquire the third image; and
   performing smooth fusion processing on a splicing boundary of the third image.

6. The method according to claim 5, wherein the reconstructing the low resolution of the first image into the high resolution identical with the resolution of the display screen comprises:
   performing spatial conversion on the first image with low resolution to acquire a YCbCr spatial image thereof, wherein Y is a non-linear brightness component, Cb is a blue color difference component, Cr is a red color difference component, and Cb and Cr components are reconstructed by using an interpolation method;
   constructing a database for training by combining a high-resolution image block Xh and a low-resolution image block Xl into database X;
   generating a dictionary D for the database X by using a sparse coding method, and decomposing the dictionary D into a dictionary Dh of a high-resolution image and a dictionary Dl of a low-resolution image;
   solving a sparse coefficient by using the Dl and a characteristic image corresponding to two times of up-sampled image of the first image with low resolution;
   solving three times of up-sampled image which is Y component, of the first image with low resolution through the sparse coefficient and the Dh; and
   combining Y, Cb and Cr to acquire a YCbCr image, converting the YCbCr image into an RGB image, and storing the RGB image to acquire the first image after high-resolution reconstruction.

7. The method according to claim 5, wherein the performing smooth fusion processing on the splicing boundary of the third image comprises:
   smoothing YUV color coding data at the splicing boundary of the third image to YUV color coding data of the whole third image by using a weighted smoothing formula $Y=Y1*(1-d)+Y2*d$, wherein Y1 and Y2 are values of YUV color coding data of adjacent images at the splicing boundary respectively, Y is a value of YUV color coding data of an overlapped image at the splicing boundary, and d is a weight; and
   directly copying YUV color coding data at a non-splicing boundary into the YUV color coding data of the whole third image for transition processing.

8. A graphics rendering apparatus of virtual reality, comprising:
   a first image generating module, configured to according to an acquired spatial position information and direction information of a head-mounted virtual reality device, render in accordance with a first angular resolution to generate a first image corresponding to the spatial position information and the direction information, wherein the first angular resolution is less than an angular resolution of a display screen, the first image is an integral image corresponding to a field of vision of the virtual reality device, and the angular resolution refers to a quantity of pixel points corresponding to each degree of the field of vision within a range of the field of vision;

a second image generating module, configured to according to an acquired position information of a human eye fixation point on the display screen, render in accordance with a second angular resolution to generate a second image corresponding to the position information of the human eye fixation point, wherein the second angular resolution is equal to the angular resolution of the display screen, and the second image is a local image around a position of the human eye fixation point; and a third image generating module, configured to synthesize the first image and the second image into a third image.

9. The apparatus according to claim 8, wherein the first angular resolution is acquired according to a preset percentage multiplied by the angular resolution of the display screen, and the preset percentage is determined according to a balance point between a required graphics rendering quality and a graphics rendering calculating amount.

10. The apparatus according to claim 8, wherein the second angular resolution is the angular resolution of the display screen of the virtual reality device, a resolution of the local image is acquired according to a preset horizontal field of vision and vertical field of vision of the local image multiplied by the second angular resolution, and the preset horizontal field of vision and the preset vertical field of vision of the local image are determined according to an image range of a required fixation point rendering effect.

* * * * *